United States Patent Office 3,246,962
Patented Apr. 19, 1966

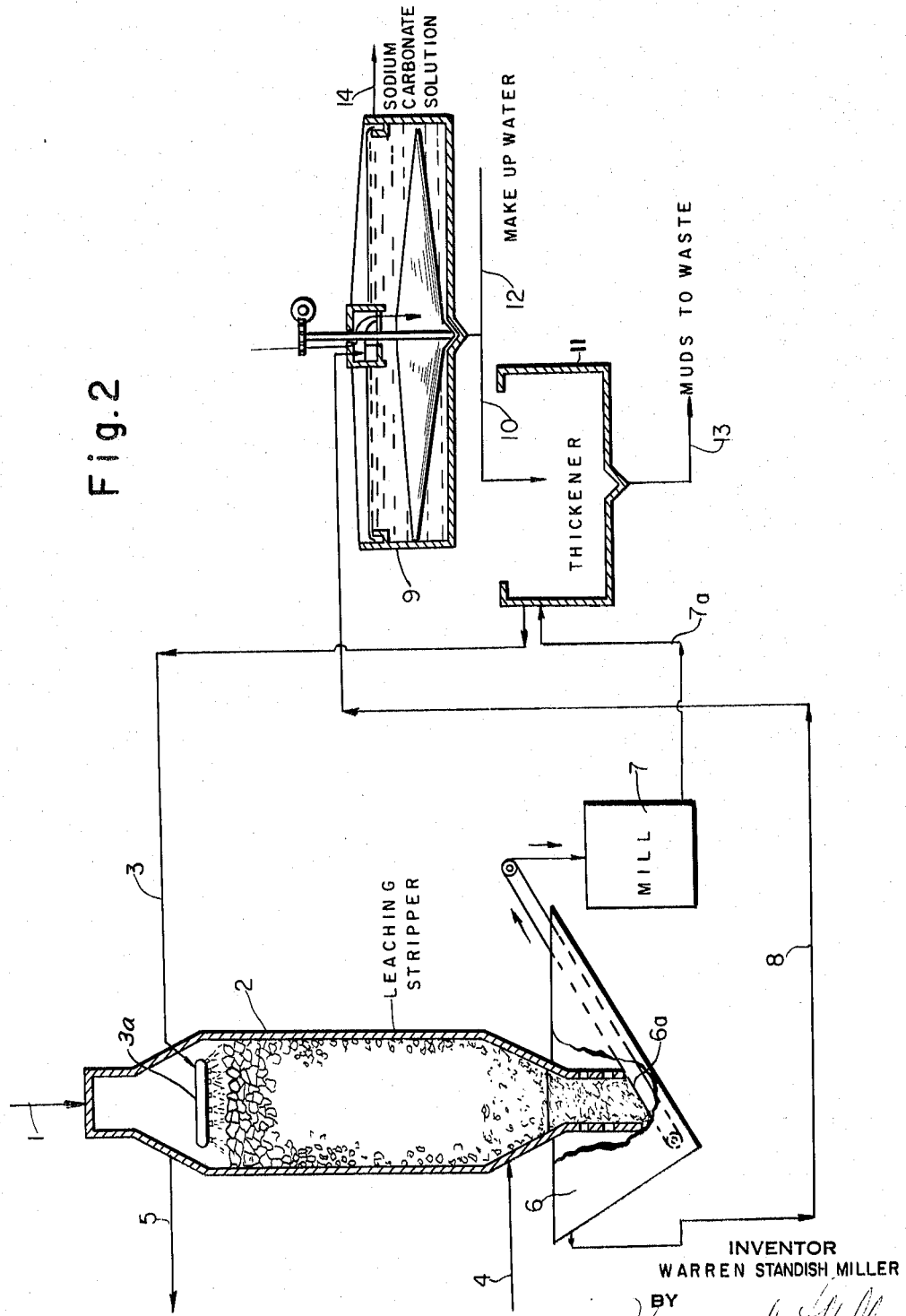

3,246,962
DISSOLVING LUMP TRONA IN A DESCENDING AQUEOUS FILM
Warren Standish Miller, Fullerton, Calif., assignor, by mesne assignments, to Intermountain Research & Development Corporation, Cheyenne, Wyo., a corporation of Wyoming
Filed Mar. 7, 1963, Ser. No. 263,525
5 Claims. (Cl. 23—311)

The invention relates to a novel continuous process for obtaining concentrated solutions of sodium carbonate and sodium bicarbonate from crude mined trona by leaching the alkali values from crude trona in a column while passing steam into the column.

Crude trona is found in underground deposits in Sweetwater County, Wyoming, and other areas around the world. The principal component of trona is sodium sesquicarbonate ($NaHCO_3 \cdot Na_2CO_3 \cdot 2H_2O$) containing varying amounts of organic and inorganic impurities. The trona deposits in Sweetwater County are found at depths varying from 1100 to 1800 feet underground and consist of a main trona bed varying from 8 to 18 feet in thickness and other beds of varying smaller thicknesses. The crude trona from the mines in Sweetwater County usually contain about 90% sodium sesquicarbonate and about 10% shale containing the organic and inorganic impurities and in the mining is produced in lumps of varying sizes from 3 to 6 inches in diameter to fine powder.

Prior art processes for the recovery of sodium carbonate from crude trona have comprised grinding the crude trona, calcining the crude trona to crude soda ash, dissolving the crude soda ash in aqueous solutions, removing insoluble materials, crystallizing sodium carbonate from the aqueous solution and recovering soda ash. The calcination of the crude trona makes the removal of impurities more difficult. When the trona is calcined at low temperatures the organic impurities in the shale become more soluble and interfere with the crystallization step. If the trona is calcined at a temperature high enough to destroy the organic impurities, silica impurities in the shale tend to become more soluble and silica removal becomes more difficult.

Other prior art processes for the recovery of sodium carbonate from crude trona comprises grinding the crude trona, dissolving the ground trona in a hot aqueous solution, usually recycled mother liquor, containing sodium carbonate and sodium bicarbonate, removing insoluble impurities from the resulting aqueous solution, crystallizing sodium sesquicarbonate from the said solution, calcining the sodium sesquicarbonate crystals to soda ash and recycling the mother liquor to dissolve more trona. The soda ash produced by this process has a bulk density of 48 to 50 pounds per cubic foot. The gross heat requirements for this process are substantial because the sodium sesquicarbonate solution is dilute due to the low solubility of sodium bicarbonate, and concentration of the sodium sesquicarbonate solution adds materially to the cost of the soda ash.

It is an object of the invention to provide a novel process for the production of solutions of sodium carbonate and sodium bicarbonate from crude trona without the expense of grinding the crude trona before dissolving.

It is another object of the invention to provide a novel process for the production of solutions of high carbonate values from crude trona which avoids solubilizing impurities by an initial calcination of trona.

It is a further object of the invention to provide a novel process for the production of solutions of sodium carbonate and sodium bicarbonate from crude trona without expensive equipment to maintain a prescribed ratio of trona feed to dissolving solution.

These and other objects and advantages of the invention will become obvious from the following detailed description.

The process of this invention for decomposing and dissolving crude lump trona in a leaching column in which an aqueous solvent is sprayed or otherwise distributed over the lumps of crude trona to produce aqueous solutions containing sodium carbonate comprises feeding crude trona lumps into the top of the said leaching column, feeding an aqueous solvent into the top of the said leaching column to contact and wet the crude trona lumps whereby sodium sesquicarbonate is dissolved in the aqueous solvent film surrounding said lumps, passing steam through said leaching column to maintain a maximum temperature therein and to decompose sodium bicarbonate to a greater or lesser degree thereby forming a concentrated aqueous solution of carbonate values, separating the trona insolubles from the concentrated aqueous carbonate solution and recovering the said concentrated aqueous carbonate solution.

As the sodium sesquicarbonate in the trona lumps is dissolved, the trona lumps settle in the leaching column and move toward the bottom of the column. By the time the lumps have reached the bottom of the column, the sodium sesquicarbonate has been removed and the lumps consist mainly of insoluble material. The lumps of insoluble materials are strong enough to support the trona lumps above them and to maintain void spaces for the passage of the steam and the concentrated aqueous carbonate solution. The rate of accumulation of the insoluble lumps is slow and there is ample volume for their accumulation before they are removed from the base of the column. Samples of the insoluble lumps removed from the column may be examined periodically to determine their content of sodium sesquicarbonate and the rate of removal of the insoluble lumps can be adjusted so that only small amounts of undissolved sodium sesquicarbonate is removed with the insoluble lumps.

The amount of steam passed into the leaching column may vary from just sufficient steam to maintain the concentrated aqueous carbonate solution at its boiling point wherein very little steam passes out of the top of the column to a maximum in which a large portion of the sodium bicarbonate is decomposed to sodium carbonate and the carbon dioxide from the decomposition passes out of the top of the column diluted with steam. The amount of steam will depend upon the solution desired for further processing or other uses of the concentrated carbonate solution.

When sodium sesquicarbonate

is dissolved in water, the resulting solution contains sodium carbonate and sodium bicarbonate. Since sodium bicarbonate tends to decompose according to the following equation:

solutions of sodium bicarbonate exhibit a vapor pressure of carbon dioxide. Removal of carbon dioxide from the solution by stripping with steam causes the reaction to proceed to the right hereby converting the sodium bicarbonate in the solution to sodium carbonate. Because the carbon dioxide content is reduced, it is not economical to convert all the sodium bicarbontae in solution because an excessive amount of steam is required but it is possible to decompose the major portion of the sodium bicarbonate economically.

The lumps of insoluble material from the leaching column can be ground to a small size and then washed with raw water to simultaneously recover residual amounts of sodium carbonate and sodium bicarbonate and to soften the raw water. The softened water may then be used to leach the crude trona lumps in the leaching column and the insolubles may be discarded. Because the volume of the insoluble lumps is only about one tenth the volume of the original trona, much less equipment is needed to grind the leached insoluble lumps than to grind the crude trona as in prior process of recovering soda ash from trona.

Since the process of the invention avoids a preliminary calcination of the crude trona, the problem of solubilizing impurities by the preliminary calcination is avoided. Since the sodium carbonate solution obtained when the leaching column is operated under stripping conditions is more concentrated than is possible when dissolving sodium sesquicarbonate, the recovery of sodium carbonate values is more economical than the prior art.

The aqueous solvent fed to the top of the leaching column need not be preheated since it will be heated by the steam entering the column. Excellent heat transfer is obtained within the column due to the large surface area and intimate contact therein. The aqueous solvent should be added in sufficient quantities to keep enough concentrated carbonate solution in the bottom of the column to form a vapor seal to prevent steam from escaping from the bottom. Higher liquid levels may be used if desired.

The concentrated carbonate solutions of the invention may be used "as is" for alkaline leaching, neutralization or other applications where a concentrated carbonate solution is required or it may be processed in a variety of ways to recover the carbonate values. The said solution can be spray dried or subjected to an evaporation procedure to obtain crystals of sodium sesquicarbonate, or hydrated sodium carbonate or anhydrous sodium carbonate which can be processed into soda ash.

When sodium sesquicarbonate is recovered from the concentrated carbonate solution by evaporative cooling of the said solution, leaching only of the crude trona lumps is preferred. In this instance, the mother liquor from the crystallization and make-up water can be used as the leaching solvent. The said solvents are preferably fed to the leaching column near their atmospheric boiling point so that the amount of steam fed to the column is only that amount necessary to heat and dissolve the trona lumps and produce a product solution at its boiling point saturated with sodium sesquicarbonate. While there may be some decomposition of sodium bicarbonate at the base of the column, the steam is condensed in heating and dissolving the trona as it rises through the column and very little steam passes out of the top of the column. The condensation of the steam increases the concentration of the carbon dioxide in the remaining steam vapor with the result that the carbon dioxide is mostly reabsorbed by the aqueous solvent in the top of the leaching column.

Referring now to the drawings:

FIG. 2 illustrates diagrammatically one embodiment of the invention.

Figure 1:
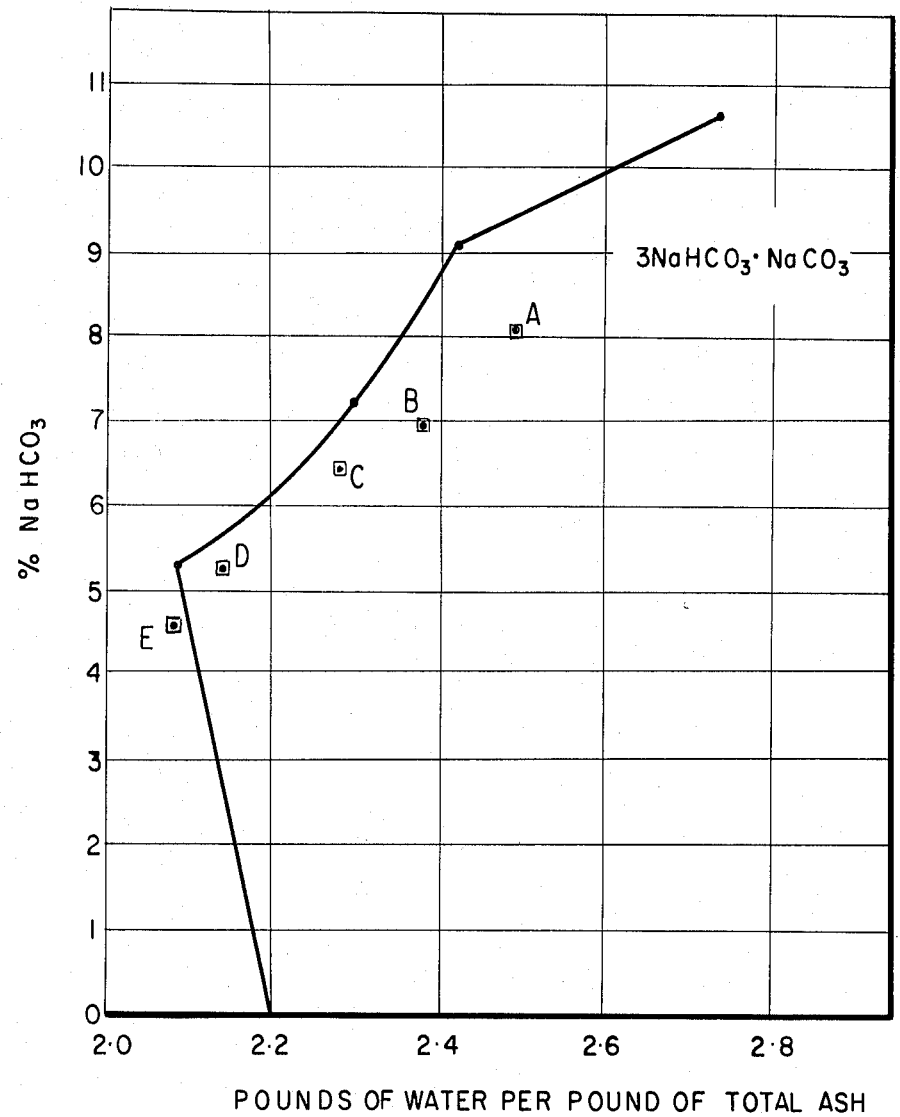
FIG. 1 is a graph showing the relation between the amount of water to be evaporated per pound of total soda ash and the percent of sodium bicarbonate in a saturated carbonate solution at its boiling point under atmospheric pressure.

For evaporative processes for the recovery of the carbonate values in the solution, the amount of water which has to be evaporated to obtain a given amount of soda ash is of great economical importance. The amount of soda ash obtainable per unit amount of carbonate solution is called its total ash content which is sodium carbonate equivalent to the sodium bicarbonate in the solution plus the sodium carbonate. The evaporation required may be expressed as pounds of water per pound of total ash.

In FIG. 1, points A to E are the compositions of liquors obtained from a laboratory leaching column at different rates of steam flow to the column, points A and B being at low steam flow and points C, D and E at increasing higher steam flows. The lower end of the line at 0% $NaHCO_3$ shows the amount of water which has to be evaporated from prior art solutions obtained from preliminary calcination of crude trona before dissolution. As can be seen from the FIG. 1, the process of the invention gives solutions which have evaporation requirement comparable to the prior art processes involving preliminary calcining.

The process of FIG. 2 illustrates the process wherein the crude mined trona is passed by conveyor 1 to the top of the leaching stripper column 2. Heated solvent at about 75° C. is added by line 3 to the top by sprayer 3a of the column 2 and preferably sprayed upon the trona lumps at a rate adequate to produce the required amount of concentrated carbonate solution. Steam is introduced by line 4 at the bottom of the leaching column 2. The top of the column is vented by line 5.

The leached solids gradually settle through the column and are removed from the base of column 2 into a hopper 6 and are removed from the hopper by conveyor 6a and ground in mill 7 to a smaller size. The ground solids are then delivered to thickener 11 by conveyor 7a. The liquor with suspended solids therein is passed from hopper 6 by line 8 to clarifier 9 wherein the solids are settled out. The solids are removed from the clarifier 9 by line 10 to thickener 11 wherein they are washed with raw water from line 12 to soften the raw water and recover additional carbonate values. The washed solids are sent by line 13 to waste disposal and the softened water is removed from thickener 11 by line 3 to be used as the solvent for the leaching of the crude trona. The clear concentrated carbonate solution is removed from clarifier 9 by line 14 and may then be used "as is" or processed by evaporative crystallization, spray drying or the like to recover the carbonate values.

In the following examples there are described several preferred embodiments to illustrate the invention. However, the invention is not intended to be limited to the specific embodiments.

*Example I*

When using the column only as a leacher to dissolve the sodium sesquicarbonate present in the crude trona and to recover the carbonate values as sodium sesquicarbonate by evaporation cooling of the product solution which comes from the column at a temperature of 95° C. and is saturated at 92° C., the following table gives the material balance necessary to obtain 274 tons of soda ash per day when the mother liquor from the crystallization step is recycled to the leaching column.

TABLE I

| | Tons Per Day | | | | |
|---|---|---|---|---|---|
| | $Na_2CO_3$ | $NaHCO_3$ | $H_2O$ | Insolubles | Total |
| Crude trona added to leaching column | 194.0 | 153.5 | 65.9 | 45.9 | 459.3 |
| Mother liquor recycle added to leaching column | 418.0 | 110.2 | 1,783.2 | | 2,311.4 |
| Make-up water added to leaching column | | | 251.6 | | 251.6 |
| Steam added to leaching column | | | 30.7 | | 30.7 |
| Discard from clarifier | 15.4 | 1.9 | 90.8 | 45.9 | 154.0 |
| Clarifier overflow liquor to crystallizers | 599.0 | 258.0 | 2,086.0 | | 2,943.0 |

*Example II*

The material balance which should be maintained in the process of FIG. 2 to obtain 274.3 tons of soda ash daily from crude trona when operating the column as a leaching stripper is summarized in Table II. The product solution contains 24.58% sodium carbonate and 7.0 sodium bicarbonate, the majority of the sodium bicarbonate being converted to sodium carbonate.

|  | Tons Per Day | | | | |
|---|---|---|---|---|---|
|  | $Na_2CO_3$ | $NaHCO_3$ | $H_2O$ | Insolubles | Total |
| Crude trona added to leaching stripper | 194.0 | 153.5 | 65.9 | 45.9 | 459.3 |
| Make-up water added to leaching stripper | | | 567.9 | | 567.9 |
| Steam added to leaching stripper | | | 176.8 | | 176.8 |
| Decomposition of $NaHCO_3$ | 53.8 | −85.3 | 9.2 | | −23.3 ($CO_2$) |
| Steam out of leaching stripper | | | 82.0 | | 82.0 |
| Discard from clarifier | 15.4 | 1.9 | 90.8 | 45.9 | 154.0 |
| Clarifier over-flow-liquor to crystallizers | 232.4 | 66.3 | 647.0 | | 945.7 |

Various modifications of the process of the invention may be made without departing from the spirit or scope thereof, and it is to be understood that the invention is intended to be limited only as defined in the appended claims.

I claim:

1. A process for dissolving crude mine-run lump trona in a leaching operation to produce aqueous solutions containing sodium carbonate values which comprises wetting the crude mine-run lump trona with an aqueous solvent flowing downwardly over the crude trona lumps and forming a film of solution thereon whereby sodium sesquicarbonate in the lump trona is dissolved in the said aqueous film, maintaining the column at substantially atmospheric pressure, passing steam upwardly through and in direct contact with the wet trona lumps to heat the column and strip $CO_2$ from said solution film thereby forming a heated aqueous solution containing sodium carbonate values, separating the trona insolubles from the said aqueous solution and recovering the aqueous solution containing sodium carbonate values.

2. A process for dissolving crude mine-run lump trona in a leaching column to produce aqueous solutions containing sodium carbonate values which comprises feeding crude mine-run trona lumps into the top of the leaching column, feeding an aqueous solvent into the top of the leaching column to contact and wet the crude trona lumps to form a film of aqueous solution thereon whereby sodium susquicarbonate in the trona lumps is dissolved in the aqueous solvent film surrounding said lumps, maintaining the colum at substantially atmospheric pressure, passing steam upwardly through said leaching column to heat the column in direct contact with the crude trona lumps and strip $CO_2$ from the solvent film thereby forming an aqueous solution containing sodium carbonate values, separating the trona insolubles from the said aqueous solution and recovering the aqueous solution containing sodium carbonate values.

3. A method of decomposing and dissolving crude mine-run lump trona in a leaching stripper column to produce aqueous solutions of sodium carbonate which comprises feeding crude mine-run trona lumps into the top of said leaching stripper column, feeding an aqueous solvent into the top of said leaching stripper column to wet the crude trona lumps and forming a film of aqueous solvent thereon whereby sodium sesquicarbonate is dissolved in said aqueous solvent, passing steam upwardly through said leaching stripper column in direct contact with the crude trona lumps to maintain the film of aqueous solvent on the trona lumps therein at its boiling point and to decompose sodium bicarbonate dissolved in said film of aqueous solvent thereby forming a concentrated aqueous sodium carbonate solution, separating the insoluble components of the trona from said aqueous carbonate solution and recovering the concentrated aqueous sodium carbonate solution.

4. A method of decomposing and dissolving crude mine-run lump trona in a leaching stripper column to produce aqueous solutions of sodium carbonate which comprises feeding crude mine-run trona lumps into the top of said leaching stripper column, feeding an aqueous solvent into the top of the said leaching stripper column to wet the crude trona lumps and surround the lumps with a film of said aqueous solvent whereby sodium sesquicarbonate is dissolved in the said film of aqueous solvent, passing steam upwardly through the leaching stripper column in direct contact with the trona lumps to heat the film of aqueous solvent and to decompose sodium bicarbonate dissolved in the aqueous solvent thereby forming a concentrated aqueous sodium carbonate solution, separating the aqueous sodium carbonate solution from the insolubles, grinding the insoluble residue from the trona, clarifying the said aqueous solution to remove the insolubles therefrom, washing the insolubles with raw water to soften the water and recover additional carbonate values therefrom, recycling the softened wash water to the top of the leaching stripper column to wet the trona and recovering the concentrated aqueous carbonate solution.

5. A method of decomposing and dissolving crude mine-run lump trona in a leaching stripper column to produce aqueous solutions of sodium carbonate which comprises feeding crude mine-run trona lumps into the top of said leaching stripper column, feeding an aqueous solvent into the top of the said leaching stripper column to wet the crude trona lumps and surround the lumps with a film of said aqueous solvent, whereby sodium sesquicarbonate is dissolved in the said film of aqueous solvent, passing steam upwardly through the leaching stripper column to heat the column in direct contact with the trona lumps, and to decompose sodium bicarbonate dissolved in the film of said aqueous solvent thereby forming a concentrated aqueous sodium carbonate solution, separating the aqueous sodium carbonate solution from the insolubles, grinding the insoluble residue from the trona, clarifying the said aqueous solution to remove the insolubles therefrom, washing the insolubles with raw water to soften the water and recover additional carbonate values therefrom, recycling the softened wash water to the top of the leaching stripper column to wet the trona, recovering the concentrated aqueous sodium carbonate solution, and crystallizing and recovering sodium carbonate values therefrom.

References Cited by the Examiner
UNITED STATES PATENTS

| 2,009,667 | 7/1935 | Keyes | 23—272.6 X |
| 2,120,287 | 6/1938 | MacMullin | 23—63 |
| 2,133,455 | 10/1938 | Keene | 23—63 |
| 2,346,140 | 4/1944 | Pike | 23—63 |
| 2,792,282 | 5/1957 | Pike | 23—38 |
| 3,119,655 | 1/1964 | Frint | 23—63 |

NORMAN YUDKOFF, *Primary Examiner.*

S. J. EMERY, *Assistant Examiner.*